United States Patent
Whinery et al.

(10) Patent No.: US 6,427,461 B1
(45) Date of Patent: Aug. 6, 2002

(54) SPACE CONDITIONING SYSTEM WITH OUTDOOR AIR AND REFRIGERANT HEAT CONTROL OF DEHUMIDIFICATION OF AN ENCLOSED SPACE

(75) Inventors: John S. Whinery, Flower Mound; Merlin K. Chapin, The Colony, both of TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 09/566,356

(22) Filed: May 8, 2000

(51) Int. Cl.[7] .................................................. F25B 49/00
(52) U.S. Cl. ................................................... 62/176.6
(58) Field of Search .......................... 62/176.1, 176.2, 62/176.3, 176.4, 176.5, 176.6, 132; 236/44 A, 44 B, 44 C, 44 R, 45, 49.1; 165/225

(56) References Cited

U.S. PATENT DOCUMENTS

| | | | | |
|---|---|---|---|---|
| 4,069,030 A | * | 1/1978 | Nickell et al. ............. | 62/176.4 |
| 4,193,781 A | * | 3/1980 | Vogel et al. ................... | 62/81 |
| 4,211,207 A | * | 7/1980 | Molivadas ................ | 126/587 |
| 4,430,864 A | * | 2/1984 | Mathiprakasam ............. | 62/94 |
| 4,827,733 A | * | 5/1989 | Dinh ........................... | 62/305 |
| 4,987,952 A | * | 1/1991 | Beal et al. .................. | 165/225 |
| 5,355,689 A | * | 10/1994 | Hara et al. ..................... | 62/159 |
| 5,752,389 A | * | 5/1998 | Harper ..................... | 62/176.5 |
| 5,826,443 A | * | 10/1998 | Ares et al. ................. | 62/324.1 |
| 5,950,442 A | * | 9/1999 | Maeda et al. ................. | 62/175 |
| 6,176,254 B1 | * | 1/2001 | Choi | |
| 6,220,039 B1 | * | 4/2001 | Kensok et al. ................. | 62/93 |

* cited by examiner

Primary Examiner—Teresa Walberg
Assistant Examiner—Daniel Robinson
(74) Attorney, Agent, or Firm—W. Kirk McCord (57) ABSTRACT

A space conditioning system for controlling the temperature and humidity of air within an enclosed space includes a vapor compression refrigeration unit having a reheat coil disposed downstream of the system evaporator coil to reheat return air after cooling and condensation of excess water vapor in the return air by the evaporator coil. The system includes a damper for controlling inflow of ambient outdoor air, depending on the total enthalpy of the outdoor air, so as to satisfy cooling and the dehumidification requirements without operating the refrigeration unit when the enthalpy of the outdoor air is suitable. The system includes a programmable controller for controlling air temperature and humidity within the enclosed space by sensing outdoor air enthalpy, temperature and humidity of air within the enclosed space and temperature or enthalpy of supply air being admitted to the enclosed space.

19 Claims, 4 Drawing Sheets

SPACE CONDITIONING SYSTEM WITH OUTDOOR AIR AND REFRIGERANT HEAT CONTROL OF DEHUMIDIFICATION OF AN ENCLOSED SPACE

FIELD OF THE INVENTION

The present invention pertains to a space conditioning system for controlling the humidity of air in an enclosed space using reheat of recirculated air and introducing ambient outdoor air if the enthalpy of the outdoor air is suitable for meeting the dehumidification demand of the system.

BACKGROUND

Space conditioning systems, including air systems which utilize vapor compression cooling of recirculated air, often require relatively accurate control of the humidity in the air in the conditioned space. Air conditioning systems are known of the type which use a vapor compression refrigeration circuit to cool and dehumidify the air entering the enclosed air conditioned space and which also utilize a heat exchanger in the air flowpath to reheat the air after the air has been cooled and dehumidified by the refrigeration circuit.

In one such system, as described in U.S. Pat. No. 5,622,057, a heat exchanger is positioned downstream of the evaporator to subcool the refrigerant before it enters the evaporator to enhance dehumidification of the air passing through the evaporator and to reheat the air after it passes through the evaporator. A major disadvantage of this type of system is that dehumidification of the air supplied to an indoor space occurs only when there is a cooling demand.

Another disadvantage of prior art air conditioning systems using vapor compression is that more energy input is required to provide the required cooling, dehumidification and reheat of the circulated air because the air must be cooled below the temperature required to meet the cooling demand in order to dehumidify the air and then reheated to a desired temperature.

The present invention provides a system and method for providing cooled and dehumidified air to an enclosed space which overcomes certain deficiencies of known systems.

SUMMARY OF THE INVENTION

The present invention provides an improved space conditioning system for cooling and dehumidifying air in an enclosed space.

In accordance with one important aspect of the invention, a space conditioning system is provided which utilizes refrigerant cooling and reheat of recirculated air or alternatively utilizes ambient outdoor air to control the humidity of the air in an enclosed space serviced by the system. In particular, the system preferably includes a vapor compression refrigeration unit wherein humidity control is provided by cooling, dehumidifying and then reheating recirculated air and wherein the reheating step is accomplished by passing the treated air through a reheating coil comprising part of the condenser circuit of the vapor compression refrigeration unit.

In accordance with another aspect of the invention a space conditioning system is provided wherein ambient outdoor air may be selectively controlled for introduction into the air being circulated to the enclosed space to control humidity in the space if the ambient outdoor air enthalpy is within a range which will provide the required dehumidification. In this regard, an enthalpy sensor is operable to sense the total enthalpy of the ambient outdoor air and a signal from the enthalpy sensor is used by a programmable controller to determine whether or not to use outdoor air for dehumidification or to use the vapor compression refrigeration unit to cool, dehumidify and reheat air being circulated to the enclosed space to control the relative humidity thereof. Dehumidification is accomplished even in the absence of a demand for space cooling.

The present invention further provides a space conditioning system which includes a control circuit wherein priority is given to meeting the cooling or heating demand of the system regardless of the humidity requirements. Under circumstances of responding to a temperature setpoint sensor (thermostat) the system will shut off flow of heated refrigerant gas to a reheat heat exchanger or coil in order to meet the air cooling requirements for the air being circulated through the enclosed space.

Still further, the invention provides a system which utilizes either relatively dry outdoor air or mechanical refrigeration to dehumidify a conditioned space when there is a demand for reducing the humidity in the enclosed space. The system includes a controller which chooses the dehumidification method, either reheat of cooled and dehumidified air or introducing ambient outdoor air into the airflow circuit. The system may comprise an otherwise substantially conventional air conditioning system which is modified to provide controls for introduction of outdoor air into the recirculated or return air circuit and also a circulated air reheat heat exchanger and control valve for controlling the flow of compressed refrigerant fluid.

In accordance with yet another aspect of the invention, a supply air sensor (which may be a temperature sensor or an enthalpy sensor) is used to control the relative proportions of return air from the space and outdoor ambient air by measuring a characteristic (temperature or enthalpy) of the air supplied to the space when dehumidification is being accomplished using ambient outdoor air instead of the reheat method using the vapor compression unit.

Those skilled in the art will further appreciate the above-mentioned features and advantages of the invention together with other important aspects thereof upon reading the detailed description which follows in conjunction with the drawings.

DETAILED DESCRIPTION OF PREFERRED EMBODIMENTS

In the description which follows like parts are marked throughout the specification and drawing with the same reference numerals, respectively. The drawing figures are not necessarily to scale and certain features of the invention are shown in schematic or generalized form in the interest of clarity and conciseness. The term "air conditioning" is used to refer to a system which conditions air to meet an air temperature and humidity requirement of an enclosed space and may include heating as well as cooling the air of the enclosed space.

Figure 1:
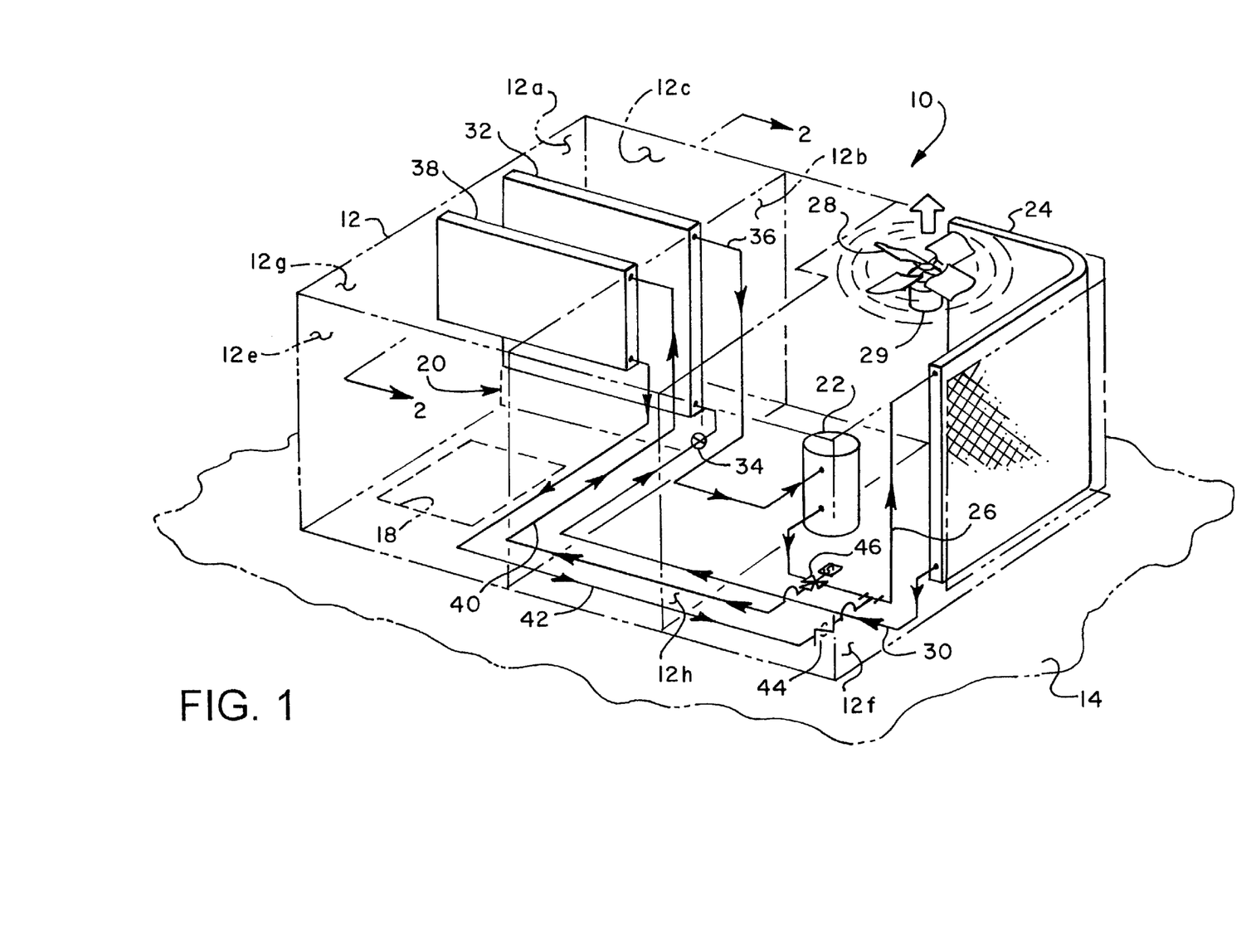
FIG. 1 is a perspective view, in somewhat schematic form, of an air conditioning system in accordance with the present invention.
Figure 2:
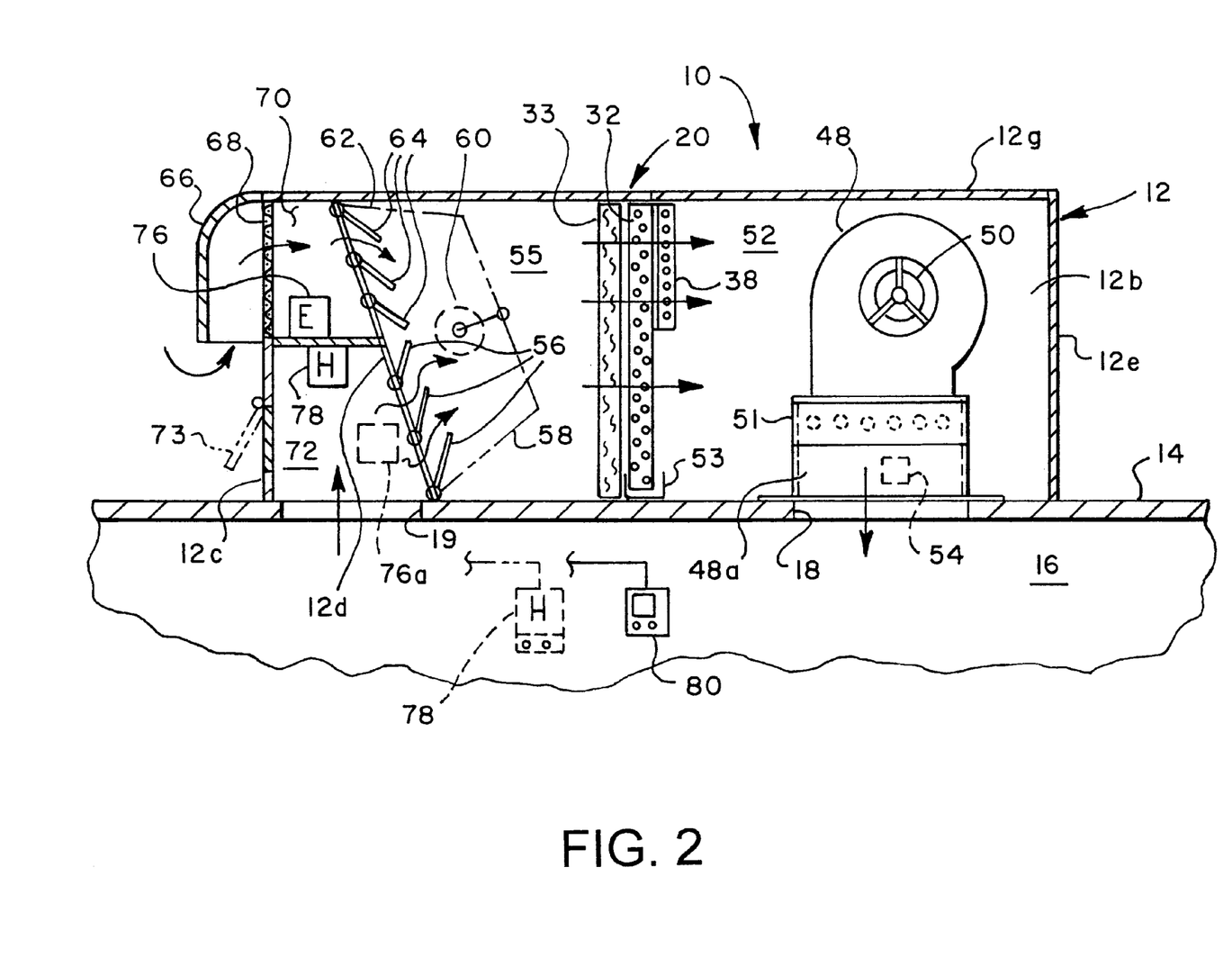
FIG. 2 is a section view, also in somewhat schematic form, taken generally from the line 2—2 of FIG. 1.

Referring to FIGS. 1 and 2 there is illustrated an air or space conditioning system in accordance with the invention and generally designated by numeral 10. The space conditioning system 10 is shown, by way of example, as a so-called rooftop type system having a generally rectangular box-like enclosure or cabinet 12 adapted to be mounted on a generally horizontal surface or rooftop 14. As shown in FIG. 2, the space conditioning system 10 is adapted to deliver conditioned air to an enclosed space 16 by way of an opening 18 and air within the enclosed space 16 is returned to the system by way of an opening 19 to the cabinet 12 for treatment by the system.

As shown in FIG. 1, the system 10 preferably includes a vapor compression refrigeration unit 20 including a compressor 22 for compressing a conventional refrigerant fluid for delivery to a conventional finned coil type heat exchanger comprising a condenser 24 by way of a conduit 26. A condenser fan 28 is suitably mounted on the cabinet 12 for drawing air through the condenser coil 24 in a conventional manner. Condenser fan 28 is preferably driven by a suitable electric motor 29. Condensed refrigerant fluid is conducted from the condenser 24 by way of a conduit 30 to a conventional refrigerant evaporator comprising a finned coil type heat exchanger 32 disposed within the cabinet 12 and arranged in an air flowpath through the cabinet, generally as shown in FIG. 2. Refrigerant evaporator coil 32 is typically disposed downstream of a suitable impingement type filter 33, as shown in FIG. 2, also disposed in the air flowpath between the return opening 19 and the discharge or supply air opening 18 for the enclosed space 16. Coil 32 extends substantially between an outer side wall 12a and an intermediate wall 12b of enclosure or cabinet 12.

Referring again to FIG. 1, the refrigerant circuit connected to the evaporator coil 32 includes an expansion device 34 interposed in conduit 30 leading to the evaporator coil. Refrigerant fluid evaporated in the coil 32 is returned to the compressor 22 by way of a conduit 36. The space conditioning system 10 advantageously utilizes refrigerant gas which has been heated by the work of compression to provide heat exchange to the air being treated by way of a so-called reheat heat exchanger comprising a serpentine finned coil unit 38 through which heated refrigerant gas may be circulated by way of an inlet conduit 40. Coil 38 also extends substantially between walls 12a and 12b and, by way of example, extends over about 50% of the area of coil 32. Compressed refrigerant gas is discharged from the reheat coil 38 by way of a conduit 42 which is connected to conduit 26 leading to condenser 24 by way of a suitable one-way or check valve 44 to prevent fluid from flowing in a direction opposite the direction indicated by the arrows of conduit 42. Heated refrigerant gas or vapor discharged from compressor 22 may be routed directly to condenser 24 by way of conduit 26 or routed by way of conduit 40 to the reheat coil 38. Control of the routing of heated refrigerant gas to the reheat coil 38 or to the condenser 24 is accomplished by actuation of a motor operated reheat valve 46, FIG. 1 interposed in conduit 26 and connected to conduit 40, as shown. Reheat valve 46 may be a conventional solenoid actuated valve, for example.

Referring further to FIG. 2, the system 10 includes a motor-driven blower 48 of conventional construction and including a suitable electric drive motor 50. In one preferred embodiment, as shown, blower 48 is disposed within cabinet 12 in a space 52 downstream of the evaporator coil 32 and the reheat coil 38 for returning conditioned air to the space 16 through opening 18. However, the blower 48 may be disposed upstream of coils 32 and 38 also. Blower 48 is shown mounted on a heater unit 51 whereby air returned to enclosed space 16 by way of opening 18 may be heated by the heater unit 51, if desired. Heater unit 51 may be one of several types of conventional heater units wherein air discharged from blower 48 passes over suitable heat exchange surfaces when the heater unit is operable. Heater unit 51 is mounted on a discharge duct or supply air duct part 48a which is in communication with opening 18.

A suitable sensor 54 is preferably interposed in duct part 48a or may, depending on the configuration of the system 10, be disposed in a suitable air supply duct further downstream from and connected to duct part 48a but upstream of the enclosed, air conditioned space 16. The location of sensor 54 in the duct part 48a is exemplary. The sensor 54 may be characterized as a temperature sensor or as an enthalpy sensor generally of a type described further herein.

As shown in FIG. 2, the reheat coil 38 is disposed downstream in the direction of airflow through the system 10 from the evaporator coil 32 and is preferably spaced about 1.0 inches or more from the coil 32 to prevent condensed water vapor collecting on the coil 32 from being carried over and residing on the fins or tube structure of the coil 38. Typically, condensed water vapor collecting on the fins and tubes of the coil 32 will flow downward to a condensate collection pan 53, FIG. 2 for suitable discharge from the system 10. Other spacings between coils 32 and 38 may be suitable.

Upstream of the coil 32 is an enclosed space 55 within the cabinet 12 through which air from the enclosed space 16 may flow by way of the opening 19 and spaces formed between a set of movable louvers or damper vanes 56 which are mechanically linked to each other and to linkage 58, for example, connected to a suitable actuator or positioning motor 60. Positioning actuator or motor 60 is also connected via linkage 62 to a damper comprising a second set of movable louvers or vanes 64 for controlling the entry of ambient outdoor air into the space 55 for flow through the coils 32 and 38 and discharge into the enclosed space 16. The apparatus comprising the aforementioned sets of louvers 56 and 64 and actuator motor 60 connected thereto is also sometimes known in the art as an "economizer".

As shown in FIG. 2, ambient outdoor air may be admitted to space 55 by way of a rain shroud 66, a suitable filter screen 68 and an enclosed space 70 which is partitioned from a space 72 by a suitable transverse partition 74. Partition 74 extends between walls 12a and 12b and between a cabinet rear wall 12c and a frame 12d for the louvers 56 and 64. Walls 12e and 12f and roof 12g, generally, form the remaining exterior walls defining enclosure or cabinet 12, as shown.

As shown in FIG. 2, a suitable enthalpy sensor 76 is disposed in the space 70 for sensing the total enthalpy of ambient outdoor air admitted to the space 70. A suitable humidity sensor 78 is preferably disposed in the return air space 72 or may, alternatively, be disposed within the enclosed space 16, as indicated in FIG. 2. Moreover, another enthalpy sensor 76a may be disposed in the return air space 72, for example, for sensing the total enthalpy of air being returned from the enclosed space 16 by way of opening 19. Accordingly, differential enthalpy measurements may be made by the sensors 76 and 76a to determine the total enthalpy of outdoor air being admitted to the system 10 as well as total enthalpy of the return air to the system 10 from the space 16. If the enthalpy of the outdoor air is less than the enthalpy of the return air, the outdoor air will be admitted to help lower the humidity of space 16. If the enthalpy of the outdoor air is greater than or equal to the enthalpy of the return air, outdoor air is not admitted.

The configuration of the damper control louvers or vanes 56 and 64 as well as the positioning motor or actuator 60 is exemplary. However, the present invention contemplates that the relative proportions of ambient outdoor air and air returned from the enclosed space 16 by way of opening 19 may be controlled by the positions of the sets of louvers or vanes 56 and 64 as determined by the actuator or motor 60 so that all, a portion or none of the air being circulated back to the space 16 may be ambient outdoor air. A suitable pressure relief damper 73, FIG. 2, for the space 72 may be provided to minimize any pressure increase in the enclosed space 16 if all or a portion of the air drawn through space 55 by blower 48 for circulation to the enclosed space 16 is from the ambient outdoor air source.

Accordingly, in circumstances where a particular humidity level within the enclosed space 16 is required, as set by the humidity sensor or humidistat 78, if the total enthalpy of the outdoor air is within the range of humidity required for the space 16, a portion or all of the air being circulated to the space 16 by the system 10 may comprise ambient outdoor air. This source of conditioned air may be substantial as long as the humidity of the air entering the space 16 is such as to satisfy the requirements of the humidity sensor which is controlling the humidity of the air in the space 16. Still further, the relative proportions of outdoor air and return air are controlled by the setting for sensor 54, as determined by the controller 92 to prevent, for example, overcooling the conditioned, enclosed space 16 if the outdoor air temperature is too low.

As shown in FIG. 2, a conventional air conditioning temperature sensor or thermostat 80 is disposed in a suitable location within the enclosed space 16 for sensing and controlling the temperature of the air in the enclosed space as determined by, preferably, an adjustable setpoint of said thermostat.

Figure 3:
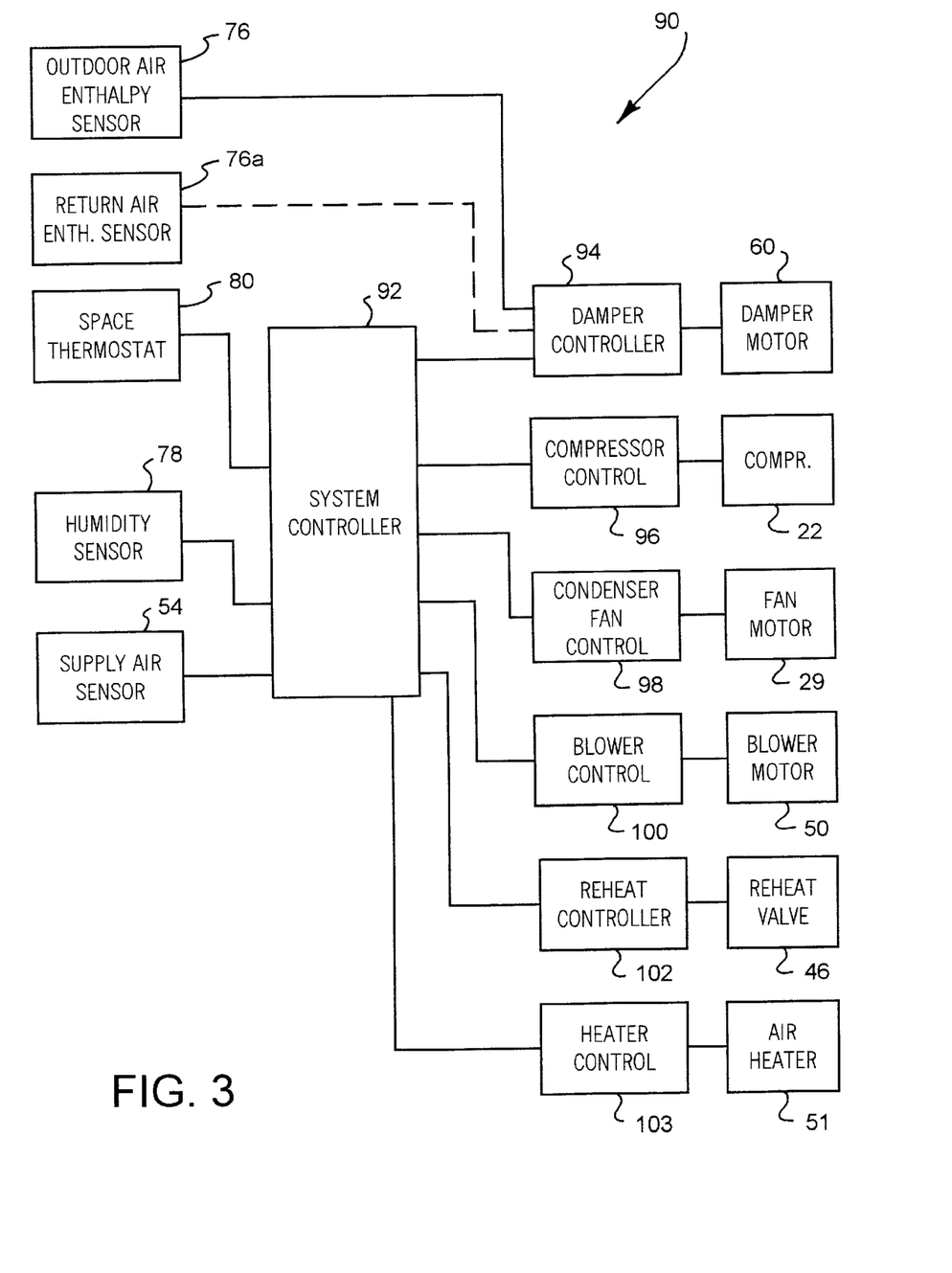
FIG. 3 is a block diagram of certain components of a control system for the air conditioning system of FIGS. 1 and 2.

Referring now to FIG. 3, there is illustrated a block diagram showing the major components of a control system for the air conditioning system 10. A control system illustrated in FIG. 3, and generally designated by the numeral 90, includes a programmable microcontroller, generally designated by the number 92. This integrated microcontroller may be of a type known, such as a type M1-4 and M1-5 manufactured by Lennox Industries, Inc., Richardson, Tex., the assignee of the present invention and instant application. The system controller 92 is adapted to receive suitably conditioned electrical signals from supply air sensor 54, outdoor air enthalpy sensor 76, humidity sensor or humidistat 78 and enclosed space temperature sensor or thermostat 80. Moreover, the system controller 92 is adapted to receive suitable control signals from a damper controller 94 for controlling damper motor or actuator 60 to modify the proportions of return air and outdoor air being admitted to the space 55. As also shown in FIG. 3, enthalpy sensors 76 and 76a may also interface directly with controller 94 and provide suitable signals thereto which may or may not be overridden by system controller 92. System controller 92 also provides a suitably conditioned electrical signal to a compressor control circuit 96 for energizing an de-energizing the drive motor of compressor 22.

As further shown in FIG. 3, system controller 92 is also adapted to provide control signals to a condenser fan control circuit 98 for energizing and de-energizing condenser fan motor 29. Still further, system controller 92 provides suitable control signals to a blower control circuit 100 for controlling energization of blower motor 50. A reheat controller 102 is adapted to provide suitable control signals for operating reheat valve 46 to direct hot compressed refrigerant gas directly to the condenser coil 24 or to the reheat coil 38 by way of conduit 40. In other words, the position of reheat valve 46 determines whether or not refrigerant fluid in gaseous form is conducted from compressor 22 through reheat coil 38 and then condenser 24 or just through the condenser coil before the condensed refrigerant fluid is delivered to the evaporator coil 32. Lastly, controller 92 may also provide suitable control signals to a heater controller 103 for operating the aforementioned air heater 51 for the system 10.

The sensors 54, 76, 76a, 78 and 80 may be adjustable to set the temperatures, enthalpy and humidity of the air being sensed to effect control signals to the system controller 92 and reheat controller 102. The sensor 54, if comprising a temperature sensor, may comprise a thermistor, for example, and temperature settings thereof controlled at controller 92. The sensor 80 may be a conventional temperature-sensing control or so-called thermostat. The enthalpy sensors 76 and 76a may be of a type commercially available, such as a model C7400 manufactured by Honeywell International, Inc. If sensor 54 is configured as an enthalpy sensor it may be of the same type as sensors 76 and 76a. The humidity sensor 78 may also be of a type commercially available, such as a model H775A also manufactured by Honeywell International, Inc.

Figure 4:
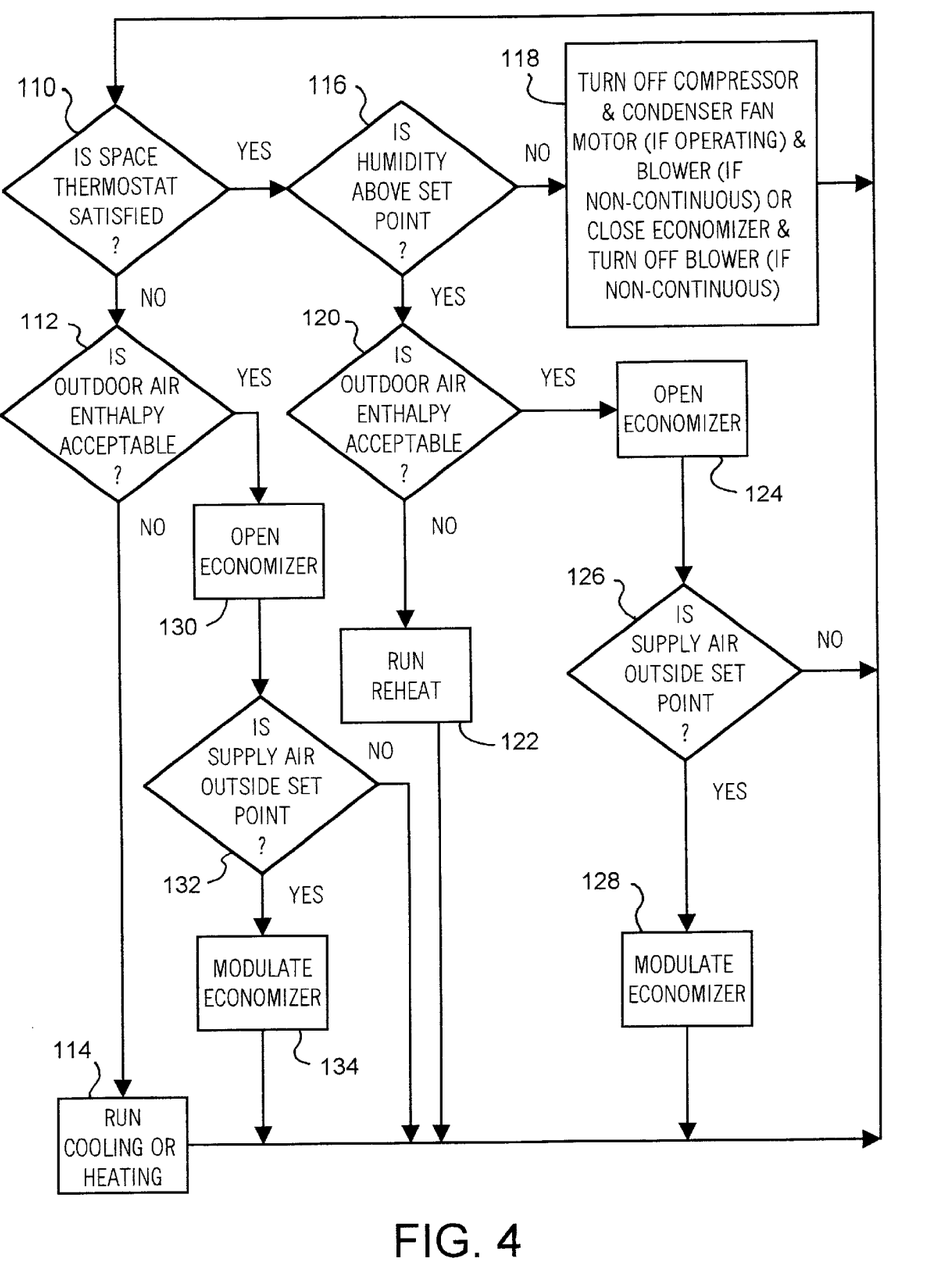
FIG. 4 is a flow diagram or decision tree for controlling the system of the present invention and illustrating certain method steps of the present invention.

The system controller 92 may be programmed to operate the air conditioning system 10 in accordance with the flow diagram or decision tree of FIG. 4. Referring to FIG. 4, the system 10 is operated by the controller 92 to satisfy a temperature setting of the thermostat 80 to provide air conditioned to the temperature setpoint of the thermostat in the enclosed space 16. Accordingly, at decision point 110 in FIG. 4, if the temperature in space 16 is above the setpoint of thermostat 80, the thermostat is not satisfied and the process proceeds to decision point 112 to determine if the outdoor area enthalpy is above or below the setpoint of enthalpy sensor 76. If the total enthalpy of the outdoor air is above the setpoint, the controller 92 causes the compressor control 96 to energize a drive motor of compressor 22, the condenser fan motor 29 and blower motor 50 indicated by step 114 in FIG. 4. Under these operating conditions reheat valve 46 is positioned to provide all hot gas discharged from the compressor 22 to flow directly to the condenser 24 to provide maximum cooling effect and hot refrigerant gas is not being circulated first through reheat coil 38. If the space thermostat 80 calls for heating space 16 controller 92 will energize heater 51 and blower motor 50. Accordingly, any time the sensor 80 determines a demand for cooling (or heating) and outdoor air enthalpy is above a setpoint of sensor 76 (for cooling operation only), the system operates through step 114 until the space cooling (or heating) demand is met.

As further shown in FIG. 4, the above-described operating mode continues until the thermostat 80 senses a temperature in the enclosed space 16 above or below the setpoint (or within an acceptable range above or below the setpoint). Once the temperature in the enclosed space 16 is at a value which satisfies the requirements for the setting of the thermostat 80, the system of the invention proceeds to decision point 116 to determine if the humidity sensor 78 indicates that the humidity level of the air in the enclosed space 16 or being circulated through the enclosed space 16 (specifically air flowing into the return air space 72) is above or below the setpoint of the humidity sensor. As shown in FIG. 4, if the humidity in the enclosed space 16 is below the setpoint, the method proceeds to step 118 wherein the controller 92 will effect shutoff of the compressor 22, fan motor 29 and blower 50, if they are operating, or cause the damper motor 60 to effectively shutoff or minimize the inflow of ambient outdoor air through the louvers or vanes 64 whereby all air being circulated through the system 10 is return air flowing through opening 19 and space 72 into space 55 or mixed outdoor and return air for return to the enclosed space 16 via the blower 48 and opening 18. If the blower 50 is not being operated continuously it will shut off at step 118 also, as indicated. This condition will exist until the thermostat 80 senses a need for cooling of the enclosed space 16 or the humidity in the space increases to the setpoint of sensor 78. The controller 92 will also, of course, operate the condenser fan controller 98 to operate the condenser fan motor 29 when the compressor 22 is operating to discharge hot gas therefrom. Moreover, the controller 92 may be programmed to cause the blower controller 100 to run the blower motor 50 continuously or at pre-determined time periods related to the operation of the compressor 22 to provide a cooling effect for air flowing through the evaporator coil 32 or a heating effect for air flowing through heater 51, depending on the mode of operation.

Referring still further to FIG. 4, if the humidity sensed by humidity sensor 78 is above the setpoint, the system 10 contemplates decision point 120 whereby outdoor air enthalpy is sensed and, if the enthalpy is greater than an acceptable level for the operating conditions, the humidity will be lowered in the enclosed space 16 by energizing compressor 22 and fan motor 29 (and blower 50 if not operating continuously) and positioning valve 46 to conduct hot gas through reheat coil 38 and then condenser 24 while cooling and dehumidification effect is accomplished by circulating condensed refrigerant through expansion device 34 and evaporator coil 32. In this operating mode, the temperature of circulated air passing through coil 32 is lowered sufficiently to condense water vapor in the circulated air and the air is reheated until the relative humidity of the circulated air within the enclosed space 16 is reduced to the setpoint of the humidity sensor 78 (or within an acceptable range determined by the humidity sensor). This process is accomplished at step 122 under the operating mode "Run Reheat" and continues until the humidity sensor 78 is satisfied or thermostat 80 indicates a need for cooling or heating in space 16.

Alternatively, at decision point 120, if the outdoor air enthalpy sensor 76 indicates that the enthalpy and humidity level of outdoor air is below the setpoint of the enthalpy sensor, the controller 92 will cause the damper controller 94 to energize actuator or motor 60 to open louvers 64 to admit ambient outdoor air, as indicated at step 124. With respect to FIG. 4, the term "Economizer" referred to therein refers to the system of louvers 56 and 64 interconnected by actuator or motor 60 and linkage 58.

Air flowing through space 55, space 52 and blower 48 is sensed by the supply air temperature or enthalpy sensor 54. Accordingly, a decision point 126 is reached wherein the sensor 54 indicates whether or not the air flowing through blower 48 to enclosed space 16 is above or below the setpoint of the sensor. For example, if sensor 54 is a temperature sensor and the supply air temperature is above the setpoint of sensor 54, the system continues to operate as described as long as the setpoint of thermostat 80 is not exceeded and the humidity remains above the setpoint of humidity sensor 78 and further wherein the enthalpy of the outdoor air remains below the setpoint of enthalpy sensor 76, or the enthalpy of the outdoor air remains below the enthalpy of the return air in the case where two enthalpy sensors 76 and 76*a* are used, as described hereinabove. Alternatively, if sensor 54 is an enthalpy sensor and the enthalpy of the supply air is below the setpoint of sensor 54, the system continues to operate as described as long as the setpoint of thermostat 80 is not exceeded and the humidity remains above the setpoint of humidity sensor 78 and further wherein the enthalpy of the outdoor air remains below the setpoint of enthalpy sensor 76, or the enthalpy of the outdoor air remains below the enthalpy of the return air in the case where two enthalpy sensors 76 and 76*a* are used, as described hereinabove.

Conversely, if the temperature of air flowing back into enclosed space 16 is lower than the setpoint of sensor 54, controller 92 operates the damper controller 94 to cause damper motor 60 to control the proportion of outdoor air admitted to space 55, as indicated at step 128 until the temperature sensed by sensor 54 rises to its setpoint. If sensor 54 is an enthalpy sensor and senses that the enthalpy of air supplied to enclosed space 16 is above its setpoint motor 60 operates to control the proportion of outdoor air also.

The control system 90 is also operable to control the proportion of outdoor air admitted to condition the air in space 16 under conditions when the temperature sensed by the thermostat 80 is above the setpoint. As indicated in FIG. 4, when the setting of thermostat 80 is not satisfied and outdoor air enthalpy is below the setpoint of enthalpy sensor 76 at decision point 112, the controller 92 may attempt to provide the requisite cooling by opening louvers 64 through operation of damper controller 94 and damper motor 60, as indicated at step 130. Again, as with the operating condition just described, if the supply air flowing back into the space 16 is below the setpoint of sensor 54 operating as a temperature sensor, as indicated at step 132, damper motor 60 is operated to modulate the positions of the louvers 64 and 56, as indicated at step 134, until the temperature increases to the setpoint of sensor 54. If the temperature sensed by sensor 54 is in excess of the setpoint, outdoor air enthalpy is below the setpoint of enthalpy sensor 76 and the temperature of the air in space 16 is above the setpoint of thermostat 80, outdoor air may be drawn into the space 16 through the flowpath previously described to provide sufficient cooling of the space 16 without requiring operation of the compressor 22 or fan motor 29 to provide cooling via the coil 32.

In a preferred embodiment of the system 10 the reheat coil 38 is preferably sized to provide a temperature increase such that the temperature of the air in space 16 is maintained at or near the setpoint of thermostat 80. Thus, preventing a higher supply air temperature minimizes the sensible cooling demands of the system. Compressed refrigerant gas flowing through the reheat coil 38 is partially condensed and condensation is completed as the refrigerant fluid flows through the condenser coil 24.

The humidity sensor 78 thus initiates the so-called reheat mode of operation of the system 10 when relative humidity of the return air flowing into space 72 (or space 16 if the humidity sensor is located in that space) is above the sensor setpoint and the humidity sensor is operable to terminate the reheat mode when the relative humidity is below the setpoint. The sensor 78 is preferably located in the space 72 for applications of the system 10 for continuous operation of blower 48. For applications wherein the blower 48 is cycled with heating or cooling demand the humidity sensor 78 is preferably located in the enclosed, conditioned space 16.

The control system 90 also, preferably, includes a lockout feature to prevent circulation of hot gas to the reheat coil 38 when the space thermostat or temperature sensor 80 is not satisfied and cooling or heating of the air being circulated through the system 10 is required.

Referring again briefly to FIG. 2, the system 10 may include sensor 54 as an enthalpy sensor for sensing the enthalpy of supply air being discharged from the blower 48. Enthalpy sensor 54 may be located in the discharge duct part 48a of the blower 48 or in an air supply duct, not shown, between the blower 48 and the space 16. If supply air enthalpy sensor 54 is used, it is associated with the system controller 92 in place of the supply air temperature sensor 54 also. Depending on the setpoint of the enthalpy sensor 54, as determined by the programmable system controller 92, the system will operate to modulate the economizer louvers 56 and 64 to control air flowing therethrough in accordance with the enthalpy sensor setting at steps 126 and 132, respectively, in the diagram of FIG. 4. Accordingly, in the instance where a supply air enthalpy sensor 54 is used in place of a supply air temperature sensor, if the enthalpy of the supply air is above a setpoint at the point of measurement by the sensor 54, the economizer louvers 56 and 64 will be positioned so as to reduce the supply air enthalpy to or near the setpoint by controlling the relative proportions of air flowing to the space 16 through the respective sets of louvers 56 and 64.

In operation, the control system 90 will operate in accordance with the decision tree or flow diagram of FIG. 4 to initiate dehumidification whenever the humidity sensor 78 determines that the humidity in the space 16 is above the setpoint. The system controller 92 will thus select the type of dehumidification in accordance with the outdoor air enthalpy condition. However, anytime the thermostat 80 determines a demand for cooling the air in space 16 and outdoor air enthalpy is not acceptable, the vapor compression unit 20 is operated and the control system 90 will prevent refrigerant fluid flow to the reheat coil 38 by positioning reheat valve 46 to direct all refrigerant fluid flow directly to the condenser 24.

Still further, if the control system 90 senses a demand for dehumidification followed by a heating demand from the thermostat 80 the system 10 will energize heater unit 51 and blower 48 and de-energize compressor 22 and condenser fan 29 and close reheat valve 46. A heating demand from the thermostat 80 followed by a dehumidification demand will not allow reheat of air by the reheat coil 38. When heating demand is satisfied and there is still demand for dehumidification the system 10 may operate to circulate hot refrigerant gas to the reheat coil 38. Moreover, once a cooling demand is satisfied and there is still a dehumidification demand the compressor 22 is not de-energized and the compressor may continue to operate to provide hot refrigerant gas to the reheat coil, if the outdoor air enthalpy is above the setpoint. In this way, the air conditioning system 10, including the control system 90, and the method of operation is more efficient than prior art systems since outdoor air may be used to provide the dehumidification required as long as ambient air conditions are below the setpoint of the enthalpy sensor 76.

The operation of the air conditioning system 10 in both a heating and cooling mode is believed to be understandable to those of ordinary skill in the art based on the foregoing description. Conventional components and control circuitry known to those of skill in the art may be used to provide the system 10 and the control system 90 therefore unless otherwise described hereinabove. Although the system 10 advantageously includes the vapor compression refrigeration unit 20, cooling and reheat of air being circulated to the enclosed space 16 may be provided by other heat exchanger means in place of the heat exchangers 32 and 38 and the unit 20 connected thereto. Although a preferred embodiment of a system and method of operation have been described, those skilled in the art will also recognize that various substitutions and modifications may be made without departing from the scope and spirit of the appended claims.

What is claimed is:

1. A space conditioning system for conditioning air within an enclosed space, comprising:

an air mover for circulating air to an enclosed space;

a first heat exchanger for cooling air being circulated to the enclosed space;

a second heat exchanger disposed to heat air being circulated to the enclosed space to a temperature above the temperature of air discharged from said first heat exchanger;

a duct in communication with said first heat exchanger for circulating air from the enclosed space through said first and second heat exchangers and said air mover for circulation back to the enclosed space;

a vapor refrigeration unit, including a compressor, a condenser, a first conduit for conducting condensed refrigerant fluid from said compressor to said first heat exchanger and a second conduit for conducting heated refrigerant gas from said compressor to said second heat exchanger; and a control system, including a humidity sensor for sensing a humidity corresponding to humidity of air in the enclosed space and a controller operably connected to said humidity sensor, said refrigeration unit being responsive to a control signal from said controller indicating that the humidity is above a setpoint of said humidity sensor to conduct heated refrigerant gas from said compressor to said second heat exchanger and from said second heat exchanger to said condenser and to conduct condensed refrigerant fluid from said condenser to said first heat exchanger, whereby air being circulated to the enclosed space is cooled and dehumidified by said first heat exchanger and is reheated by said second heat exchanger.

2. The space conditioning system of claim 1 wherein said control system is operative to prevent said space conditioning system from conducting heated refrigerant gas from said compressor to said second heat exchanger in response to any demand for cooling air in the enclosed space.

3. The space conditioning system of claim 1 wherein said control system is operative to cause said space conditioning system to discontinue conducting heated refrigerant gas from said compressor to said second heat exchanger in response to any demand for cooling air in the enclosed space.

4. The space conditioning system of claim 1 wherein said refrigeration unit is responsive to said control signal to conduct heated refrigerant gas from said compressor to said second heat exchanger in the absence of a demand for cooling in the enclosed space.

5. The space conditioning system of claim 1 further including a damper for admitting outdoor ambient air to said space conditioning system for circulation to the enclosed space, a first enthalpy sensor for sensing the enthalpy of the outdoor ambient air and a second enthalpy sensor for sensing the enthalpy of air being circulated to the enclosed space, said controller being operative to control said damper to allow the outdoor ambient air to be admitted to said space conditioning system when the enthalpy of the outdoor ambient air is less than the enthalpy of the air being circulated to the enclosed space and to inhibit the outdoor ambient air from being admitted to said space conditioning system when the enthalpy of the outdoor ambient air is greater than or equal to the enthalpy of the air being circulated to the enclosed space.

6. The space conditioning system of claim 5 wherein said controller is operative to control relative proportions of the outdoor ambient air and air returned from the enclosed space in the air which is circulated by said space conditioning system to the enclosed space.

7. The space conditioning system of claim 1 further including a damper for admitting outdoor ambient air to said space conditioning system for circulation to the enclosed space and a temperature sensor for sensing the temperature of air being circulated to the enclosed space, said temperature sensor being operably connected to said controller for causing said controller to control relative proportions of the outdoor ambient air and air returned from the enclosed space in the air being circulated to the enclosed space.

8. The space conditioning system of claim 1 further including a cabinet enclosing said first and second heat exchangers, said cabinet including an inlet opening for conducting air circulated to said space conditioning system from the enclosed space and a discharge opening for supplying air from said space conditioning system to the enclosed space, a return air space in said cabinet for receiving air returned from the enclosed space, and an outdoor air space in said cabinet in communication with outdoor ambient air for conducting the outdoor ambient air through said cabinet to the enclosed space, said space conditioning system further including a damper for controlling flow of the outdoor ambient air into said cabinet and to the enclosed space.

9. The space conditioning system of claim 8 wherein said humidity sensor is disposed within one of said return air space and the enclosed space.

10. The space conditioning system of claim 1 wherein said control system includes an enthalpy sensor for sensing the enthalpy of outdoor ambient air, said controller being operably connected to said humidity sensor and said enthalpy sensor for selectively controlling said space conditioning system to provide the enclosed space with dehumidified air by cooling and reheating air by said first and second heat exchangers or from the outdoor ambient air, depending on the enthalpy of the outdoor ambient air, in response to said control signal.

11. A space conditioning system for conditioning air within an enclosed space, comprising:
   an air mover for circulating air to the enclosed space;
   a first heat exchanger for cooling air being circulated to the enclosed space;
   a second heat exchanger disposed to heat air being circulated to the enclosed space to a temperature above the temperature of air discharged from said first heat exchanger;
   a duct in communication with said first heat exchanger for circulating air from the enclosed space through said first and second heat exchangers and said air mover for circulation back to the enclosed space;
   a humidity sensor for sensing a humidity corresponding to humidity of air in the enclosed space; and
   a controller operably connected to said humidity sensor for selectively controlling said space conditioning system to provide the enclosed space with dehumidified air by cooling and reheating air by said first and second heat exchangers in response to the humidity being above being above a setpoint of said humidity sensor in the absence of a demand for cooling in the enclosed space.

12. The space conditioning system of claim 11 wherein said control system is operative to prevent said space conditioning system from reheating air by said second heat exchanger in response to any demand for cooling air in the enclosed space.

13. The space conditioning system of claim 11 wherein said control system is operative to cause said space conditioning system to discontinue reheating air by said second heat exchanger in response to any demand for cooling in the enclosed space.

14. The space conditioning system of claim 11 wherein said control system includes an enthalpy sensor for sensing the enthalpy of outdoor ambient air, said controller being operably connected to said humidity sensor and said enthalpy sensor for selectively controlling said space conditioning system to provide the enclosed space with dehumidified air by cooling and reheating air by said first and second heat exchangers or from the outdoor ambient air, depending on the enthalpy of the outdoor ambient air, in response to said control signal.

15. The space conditioning system of claim 11 further including a damper for admitting outdoor ambient air to said space conditioning system for circulation to the enclosed space, a first enthalpy sensor for sensing the enthalpy of the outdoor ambient air and a second enthalpy sensor for sensing the enthalpy of air being circulated to the enclosed space, said controller being operative to control said damper to allow outdoor ambient air to be admitted to said space conditioning system when the enthalpy of the outdoor ambient air is less than the enthalpy of air being circulated to the enclosed space and to inhibit the outdoor ambient air from being admitted to said space conditioning system when the enthalpy of the outdoor ambient air is greater than or equal to the enthalpy of the air being circulated to the enclosed space.

16. The space conditioning system of claim 15 wherein said controller is operative to control the relative proportions of the outdoor ambient air and air returned from the enclosed space in the air which is circulated by said space conditioning system to the enclosed space.

17. The space conditioning system of claim 11 further including a damper for admitting outdoor ambient air to said space conditioning system for circulation to the enclosed space and a temperature sensor for sensing the temperature of air being circulated to the enclosed space, said temperature sensor being operably connected to said controller for causing said controller to control the relative proportions of outdoor ambient air and air returned from the enclosed space in the air which is circulated by said space conditioning system to the enclosed space.

18. The space conditioning system of claim 11 further including a cabinet enclosing said first and second heat exchangers, said cabinet including an inlet opening for conducting air circulated to said space conditioning system from the enclosed space and a discharge opening for supplying air from said space conditioning system to the enclosed space, a return air space in said cabinet, and an outdoor air space in said cabinet in communication with outdoor ambient air for conducting the outdoor ambient air through said cabinet to the enclosed space, said space conditioning system further including a damper for controlling flow of the outdoor ambient air into said cabinet and to the enclosed space.

19. The space conditioning system of claim 18 wherein said humidity sensor is disposed within one of said return air space and the enclosed space.

* * * * *